(12) United States Patent
Chandran et al.

(10) Patent No.: US 12,340,440 B2
(45) Date of Patent: Jun. 24, 2025

(54) ADAPTIVE CONVOLUTIONS IN NEURAL NETWORKS

(71) Applicants: DISNEY ENTERPRISES, INC., Burbank, CA (US); ETH Zürich (Eidgenössische Technische Hochschule Zürich), Zürich (CH)

(72) Inventors: Prashanth Chandran, Zurich (CH); Derek Edward Bradley, Zurich (CH); Paulo Fabiano Urnau Gotardo, Zurich (CH); Gaspard Zoss, Zurich (CH)

(73) Assignees: Disney Enterprises, Inc., Burbank, CA (US); ETH Zürich (Eidgenössische Technische Hochschule Zürich), Zurich (CH)

( * ) Notice: Subject to any disclaimer, the term of this patent is extended or adjusted under 35 U.S.C. 154(b) by 962 days.

(21) Appl. No.: 17/223,577

(22) Filed: Apr. 6, 2021

(65) Prior Publication Data
US 2022/0156987 A1    May 19, 2022

Related U.S. Application Data

(60) Provisional application No. 63/114,504, filed on Nov. 16, 2020.

(51) Int. Cl.
*G06T 11/00* (2006.01)
*G06N 3/045* (2023.01)
(Continued)

(52) U.S. Cl.
CPC .......... *G06T 11/001* (2013.01); *G06N 3/045* (2023.01); *G06N 3/08* (2013.01); *G06T 3/4046* (2013.01)

(58) Field of Classification Search
CPC ..... G06T 11/001; G06T 3/4046; G06T 19/20; G06T 2219/2024; G06T 3/04;
(Continued)

(56) References Cited

U.S. PATENT DOCUMENTS 10,552,977 B1 * 2/2020 Theis ................ G06T 7/70
10,565,757 B2 * 2/2020 Oxholm .............. G06T 3/40
(Continued)

FOREIGN PATENT DOCUMENTS

WO    2020/088280 A1    5/2020
WO    2020/200030 A1    10/2020

OTHER PUBLICATIONS

Bako et al., "Kernel-Predicting Convolutional Networks for Denoising Monte Carlo Renderings", ACM Transactions on Graphics, vol. 36, No. 4, Article 97, DOI: http://dx.doi.org/10.1145/3072959.3073708, Jul. 2017, pp. 97:1-97:14.
(Continued)

*Primary Examiner* — Michael S Osinski
(74) *Attorney, Agent, or Firm* — Squire Patton Boggs LLP; Sarah Mirza

(57) ABSTRACT

A technique for performing style transfer between a content sample and a style sample is disclosed. The technique includes applying one or more neural network layers to a first latent representation of the style sample to generate one or more convolutional kernels. The technique also includes generating convolutional output by convolving a second latent representation of the content sample with the one or more convolutional kernels. The technique further includes applying one or more decoder layers to the convolutional output to produce a style transfer result that comprises one or more content-based attributes of the content sample and one or more style-based attributes of the style sample.

23 Claims, 5 Drawing Sheets

(51) Int. Cl.
*G06N 3/08* (2023.01)
*G06T 3/4046* (2024.01)

(58) Field of Classification Search
CPC ........... G06T 11/60; G06T 2207/20081; G06T 2207/20084; G06T 11/00; G06T 5/50; G06T 2207/20221; G06T 5/60; G06T 2207/30201; G06T 3/02; G06T 5/70; G06T 5/77; G06T 7/10; G06N 3/045; G06N 3/08; G06N 3/047; G06N 3/084; G06N 3/063; G06N 3/048; G06N 20/00; G06N 3/044; G06N 3/082; G06N 3/088; G06V 10/82; G06V 10/774; G06V 10/454; G06V 10/764; G06V 40/171; G06V 40/161; G06F 18/214; G06F 18/00
See application file for complete search history.

(56) References Cited

U.S. PATENT DOCUMENTS

| | | | | |
|---|---|---|---|---|
| 10,909,657 | B1* | 2/2021 | Rossi | G06F 18/22 |
| 11,043,013 | B2* | 6/2021 | Jung | G06T 11/00 |
| 11,295,494 | B2* | 4/2022 | Wilensky | G06T 11/60 |
| 11,537,849 | B2* | 12/2022 | Zhu | G06V 10/774 |
| 11,580,292 | B2* | 2/2023 | Wang | G06F 40/103 |
| 11,610,351 | B2 | 3/2023 | Bethge et al. | |
| 2016/0364625 | A1* | 12/2016 | Lin | G06T 7/60 |
| 2018/0082407 | A1* | 3/2018 | Rymkowski | G06T 11/60 |
| 2018/0276542 | A1* | 9/2018 | Cheng | G06F 16/9535 |
| 2018/0357800 | A1* | 12/2018 | Oxholm | G06T 11/001 |
| 2018/0373999 | A1* | 12/2018 | Xu | G06V 20/49 |
| 2019/0026870 | A1* | 1/2019 | Hu | G06T 5/77 |
| 2019/0236814 | A1* | 8/2019 | Shlens | G06F 18/40 |
| 2019/0244329 | A1* | 8/2019 | Li | G06N 3/088 |
| 2019/0259134 | A1* | 8/2019 | Rainy | G06N 3/08 |
| 2019/0279075 | A1* | 9/2019 | Liu | G06N 3/047 |
| 2019/0325567 | A1* | 10/2019 | Jones | G06T 5/60 |
| 2019/0325628 | A1* | 10/2019 | Dubey | G06T 11/001 |
| 2020/0134778 | A1* | 4/2020 | He | G06V 10/82 |
| 2020/0151559 | A1* | 5/2020 | Karras | G06N 3/047 |
| 2020/0151938 | A1* | 5/2020 | Shechtman | G06N 3/045 |
| 2020/0202502 | A1* | 6/2020 | Tsymbalenko | G06T 5/60 |
| 2020/0226724 | A1* | 7/2020 | Fang | G06T 5/77 |
| 2020/0286273 | A1* | 9/2020 | Chen | G06V 10/764 |
| 2020/0327701 | A1 | 10/2020 | Zhou et al. | |
| 2020/0380639 | A1* | 12/2020 | Rossi | G06T 3/4046 |
| 2021/0012181 | A1* | 1/2021 | Zhu | G06N 3/08 |
| 2021/0158570 | A1* | 5/2021 | Mohandoss | H04N 9/64 |
| 2021/0232863 | A1* | 7/2021 | Seo | G06V 20/35 |
| 2021/0365710 | A1* | 11/2021 | Zhu | G06T 11/60 |
| 2022/0020191 | A1* | 1/2022 | Lin | G06T 11/60 |
| 2022/0076459 | A1* | 3/2022 | Zhang | G06T 3/4046 |
| 2022/0101577 | A1* | 3/2022 | Chakrabarty | G06T 7/11 |
| 2023/0245351 | A1* | 8/2023 | Cao | G06T 11/001 345/629 |
| 2023/0342893 | A1* | 10/2023 | Hinz | G06T 5/60 |
| 2023/0401682 | A1* | 12/2023 | Hu | G06V 10/774 |

OTHER PUBLICATIONS

Chen et al., "Coherent Online Video Style Transfer", IEEE International Conference on Computer Vision (ICCV), DOI 10.1109/ICCV.2017.126, 2017, pp. 1114-1123.
Chen et al., "StyleBank: An Explicit Representation for Neural Image Style Transfer", IEEE Conference on Computer Vision and Pattern Recognition, DOI: 10.1109/CVPR.2017.296, 2017, pp. 2770-2779.
Chen et al., "Stereoscopic Neural Style Transfer", In Proceedings of the IEEE Conference on Computer Vision and Pattern Recognition (CVPR), Jun. 2018, pp. 6654-6663.
Chen et al., "Explicit Filterbank Learning for Neural Image Style Transfer and Image Processing", Journal of Latex Class Files, vol. 14, No. 8, Aug. 2015, 15 pages.
Chen et al., "Fast Patch-based Style Transfer of Arbitrary Style", arXiv:1612.04337, 2016, pp. 1-9.
Dumoulin et al., "A Learned Representation for Artistic Style", ICLR, arXiv:1610.07629, 2017, pp. 1-26.
Gatys et al., "Image Style Transfer Using Convolutional Neural Networks", Proceedings of the IEEE Conference on Computer Vision and Pattern Recognition (CVPR), Jun. 2016, pp. 2414-2423.
Gatys et al., "Controlling Perceptual Factors in Neural Style Transfer", In Proceedings of the IEEE Conference on Computer Vision and Pattern Recognition (CVPR), DOI:10.1109/CVPR.2017.397, Jul. 2017, pp. 3985-3993.
Gharbi et al., "Sample-based Monte Carlo Denoising using a Kernel-Splatting Network", ACM Trans. Graph., vol. 38, No. 4, Article 125, https://doi.org/10.1145/3306346.3322954, Jul. 2019, pp. 125:1-125:12.
Ghiasi et al., "Exploring the structure of a real-time, arbitrary neural artistic stylization network", arXiv:1705.06830, Aug. 28, 2017, pp. 1-27.
Howard et al., "MobileNets: Efficient Convolutional Neural Networks for Mobile Vision Applications", arXiv:1704.04861, 2017, 9 pages.
Huang et al., "Arbitrary Style Transfer in Real-time with Adaptive Instance Normalization", In Proceedings of the IEEE International Conference on Computer Vision (ICCV), arXiv:1703.06868, Oct. 2017, 11 pages.
Brabandere et al., "Dynamic Filter Networks", In Advances in Neural Information Processing Systems (NIPS 2016), 2016, pp. 667-675.
Jing et al., "Dynamic Instance Normalization for Arbitrary Style Transfer", The 34th AAAI Conference on Artificial Intelligence (AAAI-20), 2020, pp. 4369-4376.
Jing et al., "Neural Style Transfer: A Review", IEEE Transactions on Visualization and Computer Graphics, doi:10.1109/tvcg.2019.2921336, 2019, pp. 1-20.
Johnson et al., "Perceptual Losses for Real-Time Style Transfer and Super-Resolution", In European Conference on Computer Vision, DOI: 10.1007/978-3-319-46475-6_43, 2016, pp. 694-711.
Karras et al., "A Style-Based Generator Architecture for Generative Adversarial Networks", In Proceedings of the IEEE/CVF Conference on Computer Vision and Pattern Recognition (CVPR), Jun. 2019, pp. 4401-4410.
Karras et al., "Analyzing and Improving the Image Quality of StyleGAN", In Proceedings of the IEEE/CVF Conference on Computer Vision and Pattern Recognition (CVPR), Jun. 2020, pp. 8110-8119.
Kotovenko et al., "Content and Style Disentanglement for Artistic Style Transfer", In Proceedings of the IEEE/CVF International Conference on Computer Vision (ICCV), Oct. 2019, pp. 4422-4431.
Li et al., "Learning Linear Transformations for Fast Image and Video Style Transfer", In Proceedings of the IEEE/CVF Conference on Computer Vision and Pattern Recognition (CVPR), Doi 10.1109/CVPR.2019.00393, Jun. 2019, pp. 3804-3812.
Li et al., "Universal Style Transfer via Feature Transforms", In Proceedings of the 31st International Conference on Neural Information Processing Systems, NIPS' 17, arXiv:1705.08086, 2017, pp. 385-395.
Lin et al., "Microsoft COCO: Common Objects in Context", Computer Vision—ECCV 2014, 2014, pp. 740-755.
Mildenhall et al., "Burst Denoising with Kernel Prediction Networks", In Proceedings of the IEEE/CVF Conference on Computer Vision and Pattern Recognition (CVPR), 2018, pp. 2502-2510.
Niklaus et al., "Video Frame Interpolation via Adaptive Convolution", In 2017 IEEE Conference on Computer Vision and Pattern Recognition (CVPR), arXiv:1703.07514, 2017, pp. 2270-2279.
Niklaus et al., "Video Frame Interpolation via Adaptive Separable Convolution", In Proceedings of the IEEE International Conference on Computer Vision (ICCV), Oct. 2017, pp. 261-270.
Niklaus et al., "Revisiting Adaptive Convolutions for Video Frame Interpolation", arXiv:2011.01280, 2020, 11 pages.
Park et al. "Semantic Image Synthesis with Spatially-Adaptive Normalization", 2019 IEEE/CVF Conference on Computer Vision and Pattern Recognition (CVPR), DOI 10.1109/CVPR.2019.00244, 2019, pp. 2332-2341.

(56) References Cited

OTHER PUBLICATIONS

Shen et al., "Neural Style Transfer via Meta Networks", In 2018 IEEE/CVF Conference on Computer Vision and Pattern Recognition, DOI 10.1109/CVPR.2018.00841, 2018, pp. 8061-8069.

Sheng et al., "Avatar-Net: Multi-scale Zero-shot Style Transfer by Feature Decoration", In Proceedings of the IEEE Conference on Computer Vision and Pattern Recognition, 2018, pp. 8242-8250.

Simonyan et al., "Very Deep Convolutional Networks for Large-Scale Image Recognition", In International Conference on Learning Representations, arXiv:1409.1556, 2015, pp. 1-14.

Ulyanov et al., "Texture Networks: Feed-forward Synthesis of Textures and Stylized Images", Proceedings of Machine Learning Research, vol. 48, Jun. 20-22, 2016, pp. 1349-1357.

Ulyanov et al., "Improved Texture Networks: Maximizing Quality and Diversity in Feed-forward Stylization and Texture Synthesis", In 2017 IEEE Conference on Computer Vision and Pattern Recognition CVPR 2017, arXiv:1701.02096, Jul. 21-26, 2017, pp. 4105-4113.

Vogels et al., "Denoising with Kernel Prediction and Asymmetric Loss Functions", ACM Trans. Graph., vol. 37, No. 4, Article 124, https://doi.org/10.1145/3197517.3201388, Aug. 2018, pp. 124:1-124:15.

Xia et al., "Basis Prediction Networks for Effective Burst Denoising with Large Kernels", In Proceedings of the IEEE/CVF Conference on Computer Vision and Pattern Recognition (CVPR), Jun. 2020, pp. 11844-11853.

Xue et al., "Visual Dynamics: Probabilistic Future Frame Synthesis via Cross Convolutional Networks", In Advances of Neural Information Processing Systems, 2016, pp. 1-9.

Zamora-Esquivel et al., "Adaptive Convolutional Kernels", 2019 IEEE/CVF International Conference on Computer Vision Workshop (ICCVW), DOI 10.1109/ICCVW.2019.00249, 2019, pp. 1998-2005.

Zhu et al., "Sean: Image Synthesis with Semantic Region-Adaptive Normalization", In Proceedings of the IEEE/CVF Conference on Computer Vision and Pattern Recognition (CVPR), Jun. 2020, pp. 5104-5113.

GB Combined Search and Examination Report for application No. 2116277.1 dated Sep. 9, 2022.

Shen et al., "Meta Networks for Neural Style Transfer", arXiv:1709.04111, Sep. 13, 2017, 8 pages.

Kato et al., "Neural 3D Mesh Renderer", DOI:10.1109/CVPR.2018.00411, Jun. 18, 2018, pp. 3907-3916.

Wang et al., "Neural Pose Transfer by Spatially Adaptive Instance Normalization", CVPR, DOI:10.1109/CVPR42600.2020.00587, Jun. 13, 2020, pp. 5831-5839.

Sanakoyeu et al., "A Style-Aware Content Loss for Real-time HD Style Transfer", https://arxiv.org/abs/1807.10201, Proceedings of the European conference on computer vision, ECCV, Jul. 28, 2018, 22 pages.

Gatys et al., Image Style Transfer Using Convolutional Neural Networks, 2016 IEEE Conference on Computer Vision and Pattern Recognition (CVPR), Jun. 27-30, 2016, 10 pages. https://ieeexplore.ieee.org/document/7780634 or https://scholar.google.de/citations?view_op=view_citation&hl=en&user=ADMVEmsAAAAJ&citation_for_view=ADMVEmsAAAAJ:UeHWp8X0CEIC.

First Office Action received for Chinese Application No. 202111355035.3 dated May 28, 2024, 5 pages.

GB Examination Report received for Application No. GB2116277.1 dated Oct. 23, 2024.

Second Office Action received for Chinese Application No. 202111355035.3 dated Jan. 21, 2025, 3 pages.

GB Examination Report received for Application No. 2116277.1, Jan. 27, 2025, 3 pages.

* cited by examiner

ADAPTIVE CONVOLUTIONS IN NEURAL NETWORKS

CROSS-REFERENCE TO RELATED APPLICATIONS

This application claims benefit of United States Provisional Patent Application titled "ADAPTIVE CONVOLUTIONS FOR STYLE TRANSFER," filed Nov. 16, 2020 and having Ser. No. 63/114,504. The subject matter of this related application is hereby incorporated herein by reference.

BACKGROUND

Field of the Various Embodiments

Embodiments of the present disclosure relate generally to convolutional neural networks, and more specifically, to adaptive convolutions in neural networks.

DESCRIPTION OF THE RELATED ART

Style transfer refers to a technique for transferring the "style" of a first image onto a second image without modifying the content of the second image. For example, colors, patterns, and/or other style-based attributes of the first image may be transferred onto one or more faces, buildings, bridges, and/or other objects in the second image without removing the objects from the second image or adding new objects to the second image.

Existing style transfer methods typically use convolutional neural networks to learn or characterize the "global" statistics of the style image and transfer the statistics to the content image. For example, an encoder network may be used to generate feature maps for both the content and style images. A mean and standard deviation may be calculated for one or more portions of the feature map for the style image, and the corresponding portion(s) of the feature map for the content image may be normalized to have the same mean and standard deviation. A decoder network may then be used to convert the normalized feature map into an output image that combines the style of the style image with the content of the content image.

On the other hand, existing style transfer techniques are unable to identify or transfer "local" features in the style image to the content image. Continuing with the above example, the output image may capture the overall style of the style image but lack edges, lines, and/or other lower-level properties of the style image.

As the foregoing illustrates, what is needed in the art are techniques for improving the transfer of both global and local characteristics of style images onto content images during style transfer.

SUMMARY

One embodiment sets forth a technique for performing style transfer between a content sample and a style sample. The technique includes applying one or more neural network layers to a first latent representation of the style sample to generate one or more convolutional kernels. The technique also includes generating convolutional output by convolving a second latent representation of the content sample with the one or more convolutional kernels. The technique further includes applying one or more decoder layers to the convolutional output to produce a style transfer result that comprises one or more content-based attributes of the content sample and one or more style-based attributes of the style sample.

One technological advantage of the disclosed techniques is reduced overhead and/or resource consumption over existing techniques for producing content in a certain style. For example, a conventional technique for adapting an image, video, and/or other content to a new style may involve users manually capturing, creating, editing, and/or re-rendering the content to reflect the new style. Drawing, modeling, editing, and/or other tools used by the users to create, update, and store the content may consume significant computational, memory, storage, network, and/or other resources. In contrast, the disclosed techniques may perform batch processing that uses the style transfer model to automatically transfer the style onto the content, which consumes less time and/or resources than the manual creation or modification of the content performed in the conventional technique. Consequently, by automating the transfer of different styles to content, the disclosed embodiments provide technological improvements in computer systems, applications, frameworks, and/or techniques for generating content and/or performing style transfer.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
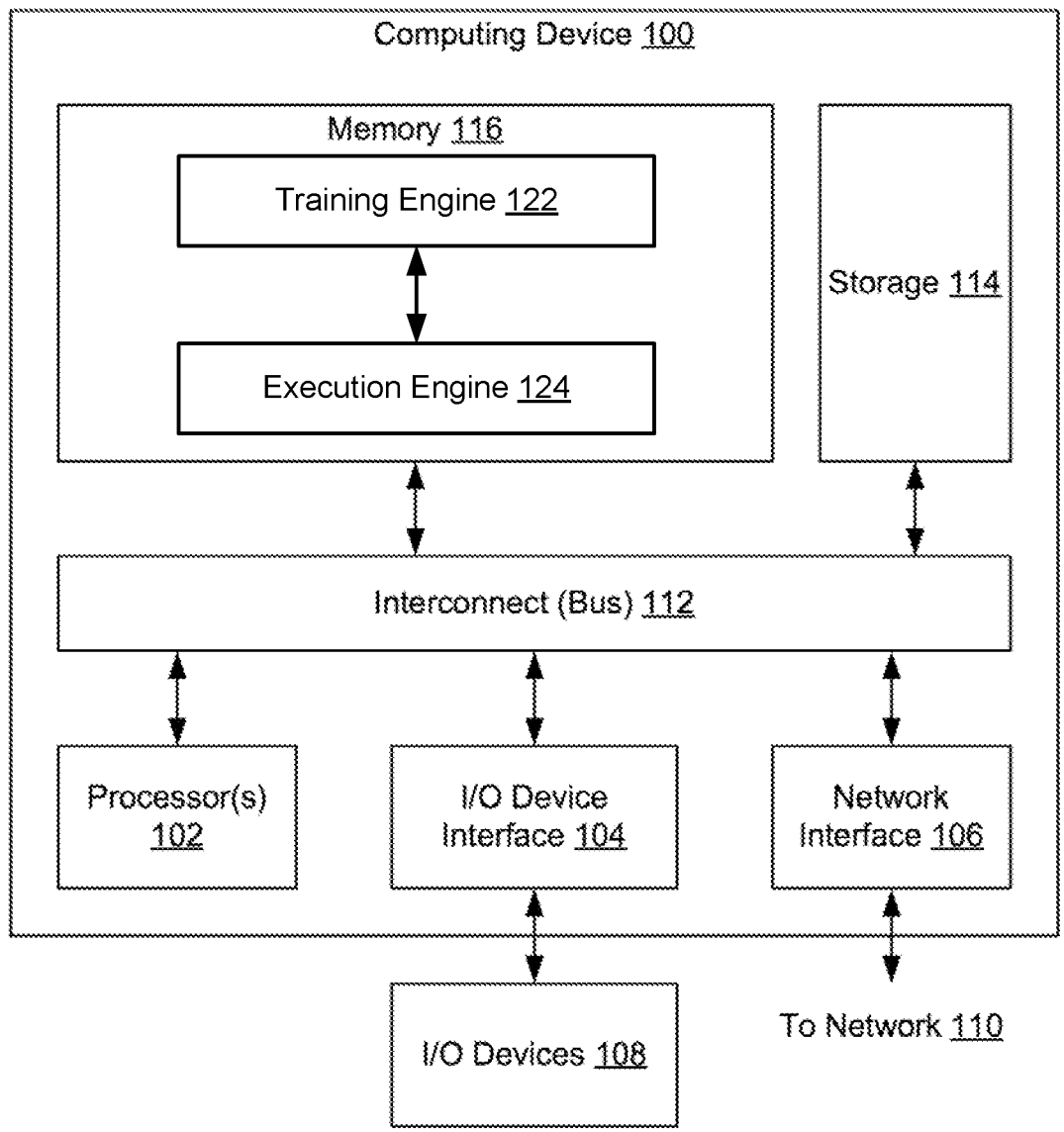
FIG. 1 illustrates a system configured to implement one or more aspects of various embodiments.

FIG. 1 illustrates a computing device 100 configured to implement one or more aspects of various embodiments. In one embodiment, computing device 100 may be a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and an execution engine 124 that reside in a memory 116. It is noted that the computing device described herein is illustrative and that any other technically feasible configurations fall within the scope of the present disclosure. For example, multiple instances of training engine 122 and execution engine 124 may execute on a set of nodes in a distributed system to implement the functionality of computing device 100.

In one embodiment, computing device 100 includes, without limitation, an interconnect (bus) 112 that connects one or more processors 102, an input/output (I/O) device interface 104 coupled to one or more input/output (I/O) devices 108, memory 116, storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

In one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122 and execution engine 124 may be stored in storage 114 and loaded into memory 116 when executed.

In one embodiment, memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

Training engine 122 includes functionality to train a style transfer model, and execution engine 124 includes functionality to use the style transfer model to generate a style transfer result that includes the style of an input style sample (e.g., an image) and the content of an input content sample. As described in further detail below, the style transfer model may learn features of the style sample at different granularities and/or resolutions. The features may then be combined with the content of the content sample to produce a style transfer result that "adapts" the content in the content sample to the style of the style sample. Consequently, the style transfer model may produce output that more accurately captures the style of the style sample than existing style transfer techniques.

Adaptive Convolutions for Style Transfer

Figure 2:
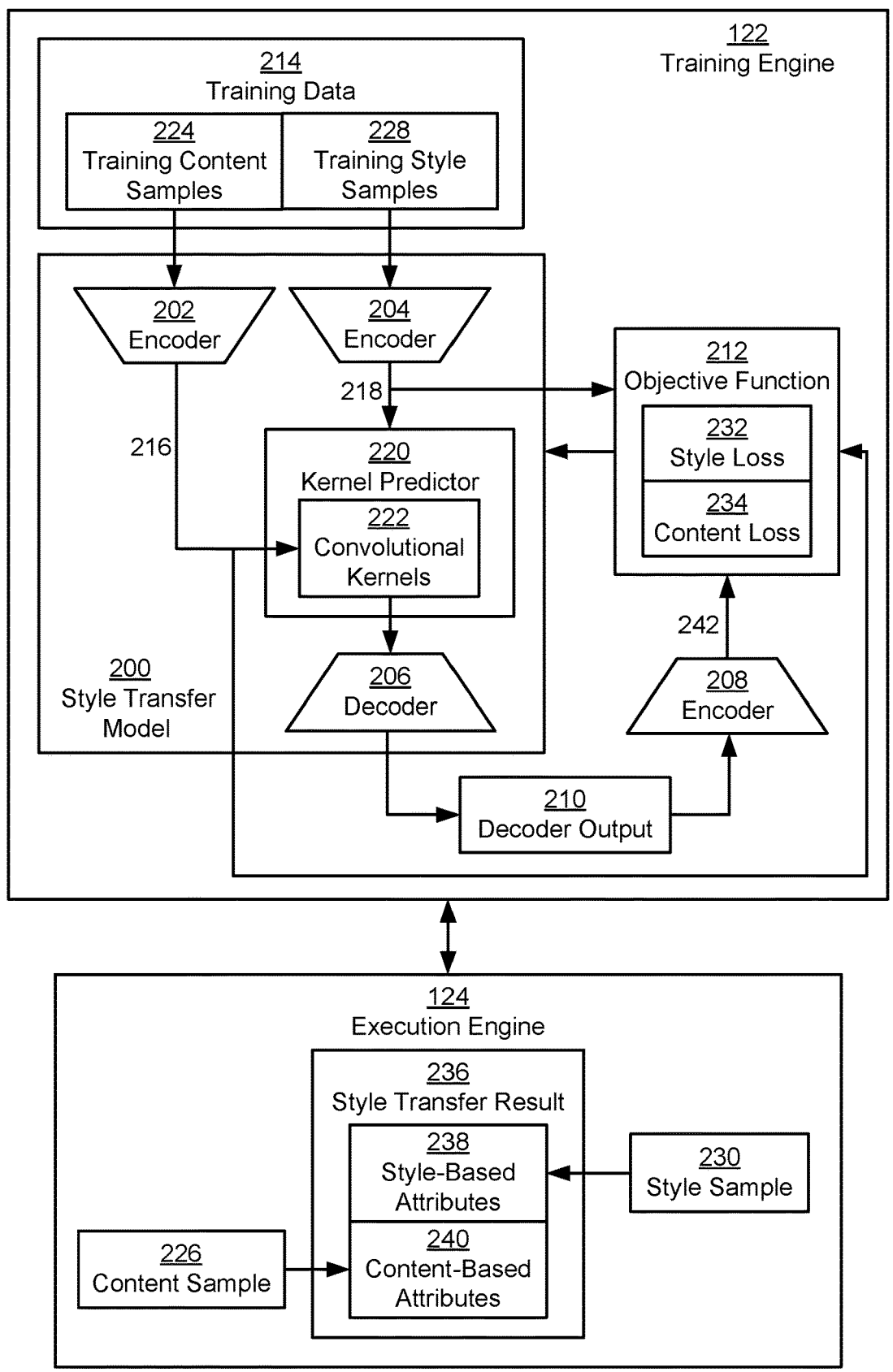
FIG. 2 is a more detailed illustration of the training engine and estimation engine of FIG. 1, according to various embodiments.

FIG. 2 is a more detailed illustration of training engine 122 and execution engine 124 of FIG. 1, according to various embodiments. As mentioned above, training engine 122 and execution engine 124 operate to train and execute a style transfer model 200 that generates a style transfer result 236 from a content sample 226 and a style sample 230.

Content sample 226 includes a visual representation and/or model of one or more content-based attributes 240. For example, content sample 226 may include an image, mesh, and/or other two-dimensional (2D) or three-dimensional (3D) depiction of one or more objects (e.g. face, building, vehicle, animal, plant, road, water, etc.) and/or abstract shapes (e.g., lines, squares, round shapes, curves, polygons, etc.). Content-based attributes 240 of content sample 226 may include distinguishing visual or physical attributes, hierarchies, or arrangements of these objects and/or shapes (e.g., a face is an object that includes a recognizable arrangement of eyes, ears, nose, mouth, hair, and/or other objects, and each object inside the face is represented by a recognizable arrangement of lines, angles, polygons, and/or other abstract shapes).

Style sample 230 includes a visual representation and/or model of one or more style-based attributes 238. For example, style sample 230 may include a drawing, painting, sketch, rendering, photograph, and/or another 2D or 3D depiction that is different from content sample 226. Style-based attributes 238 in style sample 230 may include, but are not limited to, brush strokes, lines, edges, patterns, colors, bokeh, and/or other artistic or naturally occurring attributes that define the manner in which content is depicted.

In one or more embodiments, execution engine 124 combines content-based attributes 240 of content sample 226 and style-based attributes 238 of style sample 230 into style transfer result 236. More specifically, execution engine 124 may provide content sample 226 and style sample 230 as input into a trained style transfer model 200, and style transfer model 200 may extract content-based attributes 240 from content sample 226 and style-based attributes 238 from style sample 230. Style transfer model 200 may then generate style transfer result 236 to have a predefined and/or user-controlled mix or balance of content-based attributes 240 from content sample 226 and style-based attributes 238 from style sample 230.

As shown, style transfer model 200 includes one or more encoders 202, 204, a kernel predictor 220, and a decoder 206. Encoder 202 may generate, for a given content sample (e.g., content sample 226), a latent representation 216 of the content sample. Encoder 204 may generate, for a given style sample (e.g., style sample 230), a latent representation 218 of the style sample. For example, each of encoders 202, 204 may convert pixels, voxels, points, textures, and/or other information in an inputted sample (e.g., a style and/or content sample) into a number of vectors and/or matrices in a lower-dimensional latent space. In general, encoders 202 and 204 may be implemented as the same encoder or as different encoders.

In some embodiments, encoders 202, 204 include one or more portions of one or more pre-trained convolutional neural networks (CNNs). These pre-trained CNNs may include, but are not limited to, a VGG, ResNet, Inception, MobileNet, DarkNet, AlexNet, GoogLeNet, and/or another type of deep CNN that is trained to perform image classification, object detection, and/or other tasks related to the content in a large dataset of images.

Encoders 202, 204 may include one or more layers from the same and/or different pre-trained CNNs. For example, each of encoders 202, 204 may use the same set of layers from a pre-trained CNN to generate feature embeddings $F_C$ and $F_S$ from the respective content and style samples. Each feature embedding may include a number of channels (e.g., 512) of matrices of a certain size (e.g., 16×16, 8×8, etc.). In another example, encoders 202, 204 may use different CNNs and/or layers to convert different types of data (e.g., 2D image data and 3D mesh data) into feature embeddings $F_C$ and $F_S$ and/or generate feature embeddings with different sizes and/or numbers of channels from the corresponding content and style samples.

Each of encoders 202, 204 may optionally include additional layers that further convert the output of the corresponding pre-trained CNN into a latent representation (e.g., latent representations 216, 218) of the corresponding inputted sample. For example, encoder 202 may include one or more neural network layers that generate latent representation 216 as a normalized feature embedding $F_C^N$ from the feature embedding $F_C$ (e.g., by scaling and shifting values in $F_C$ to have a certain mean and standard deviation). In another example, encoder 204 may include one or more neural network layers that generate latent representation 218 by compressing the feature embedding $F_S$ into a vector $W_S$ in a d-dimensional "latent style space" associated with the corresponding style sample.

Kernel predictor 220 generates a number of convolutional kernels 222 from latent representation 218 outputted by encoder 204 from a given style sample. For example, kernel predictor 220 may convert latent representation 218 (e.g., the vector $W_S$) into a number of n×n (e.g., 3×3) convolutional kernels 222 $K_S$. The normalized feature embedding $F_C^N$ and/or another latent representation 216 generated by encoder 202 from a given content sample is convolved with $K_S$ to transfer the statistical and structural properties of the style sample to latent representation 216 of the content sample. In some embodiments, a statistical property includes one or more statistical values associated with a visual attribute of the style sample, such as the mean and standard deviation of colors, brightness and/or sharpness in the style sample, regardless of where these attributes appear in the style sample. In some embodiments, a structural property includes a "spatial distribution" of patterns, geometric shapes, and/or other features in the style sample, which can be captured by some or all convolutional kernels 222.

In some embodiments, kernel predictor 220 additionally generates a scalar bias for each channel of output from each convolutional kernel. The bias may be added to the convolutional output produced by convolving a given input with a corresponding convolutional kernel included in convolutional kernels 222.

In some embodiments, kernel predictor 220 produces multiple convolutional kernels 222 that are sequentially applied at varying resolutions to convey features at different levels of detail and/or granularity from the style sample. For example, kernel predictor 220 may generate a first series of convolutional kernels 222 that produce convolutional output at a first resolution. Latent representation 216 may be inputted into the first convolutional kernel in the first series to generate convolutional output at the first resolution (e.g., a higher resolution than latent representation 216), and the output of each kernel in the first series is used as input into the next kernel in the first series to produce additional convolutional output at the first resolution. Kernel predictor 220 may also generate a second series of convolutional kernels 222 that produce convolutional output at a second resolution that is higher than the first resolution. The output of the last kernel in the first series is used as input into the first kernel in the second series to produce convolutional output at the second resolution, and the output of each kernel in the second series is used as input into the next kernel in the second series to produce additional convolutional output at the second resolution. Additional nonlinear activations, fixed convolution blocks, upsampling operations, and/or other types of layers or operations may be applied to the convolutional output of a given convolutional kernel before a convolution with a subsequent convolutional kernel is performed. Additional series of convolutional kernels 222 may optionally be produced from latent representation 216 and convolved with output from previous convolutional kernels 222 to further increase the resolution of the convolutional output and/or apply features associated with the style sample at the increased resolution(s) to latent representation 216 of the content sample. Consequently, kernel predictor 220 may "adapt" convolutional kernels 222 to reflect multiple levels of features in the style sample instead of using the same static set of convolutional kernels to perform convolutions in style transfer model 200.

Decoder 206 converts the convolutional output from the last convolutional kernel in $K_S$ into a visual representation and/or model of the content and/or style represented by the convolutional output. For example, decoder 206 may include a CNN that applies additional convolutions and/or up-sampling to the convolutional output to generate decoder output 210 that includes an image, mesh, and/or another 2D or 3D representation.

In one or more embodiments, some or all convolutions involving latent representation 216 and convolutional kernels 222 are integrated into decoder 206. For example, decoder 206 may convolve the convolutional output generated by one or series of convolutional kernels 222 from latent representation 216 with one or more additional series of convolutional kernels 222 during conversion of the convolutional output into decoder output 210. Alternatively, all convolutional kernels 222 may be used in layers of decoder 206 to convert latent representation 216 into decoder output 210. The use of decoder 206 to perform some or all convolutions involving latent representation 216 and convolutional kernels 222 allows these convolutions to be performed at varying (e.g., increasing) resolutions. In other words, convolutional kernels 222 may be used by any components or layers of style transfer model 200 after convolutional kernels 222 have been produced by kernel predictor 220 from latent representation 218.

Training engine 122 trains style transfer model 200 to perform style transfer between pairs of training content samples 224 and training style samples 228 in a set of training data 214. For example, training engine 122 may generate each pair of samples by randomly selecting a training content sample from a set of training content samples 224 in training data 214 and a training style sample from a set of training style samples 228 in training data 214.

For each training content sample-training style sample pair selected from training data 214, training engine 122 inputs the training content sample into encoder 202 and inputs the training style sample into encoder 204. Next, training engine 122 inputs latent representation 218 of the training style sample into kernel predictor 220 to produce convolutional kernels 222 that reflect the feature map associated with the training style sample and convolves latent representation 218 with convolutional kernels 222 to produce convolutional output. Training engine 122 then inputs the convolutional output into decoder 206 to produce decoder output 210 from the convolutional output. Training engine 122 also, or instead, uses some or all convolutional kernels 222 in one or more layers of decoder 206 to convert latent representation 216 and/or convolutional output from prior convolutional kernels 222 into decoder output 210.

Training engine 122 updates the parameters of one or more components of style transfer model 200 based on an objective function 212 that includes a style loss 232 and a content loss 234. As shown, style loss 232 and content loss 234 may be determined using latent representations 216, 218, as well as a latent representation 242 generated by an encoder 208 from decoder output 210. For example, encoder 208 may include the same pre-trained CNN layers as encoders 202 and/or 204. As a result, encoder 208 may output latent representation 242 in the same latent space as and/or in a similar latent space to those of feature embeddings $F_C$ and $F_S$.

In one or more embodiments, style loss 232 represents a difference between latent representation 242 and latent representation 218, and content loss 234 represents a difference between latent representation 242 and latent representation 216. For example, style loss 232 may be calculated as a measure of distance (e.g., cosine similarity, Euclidean distance, etc.) between latent representations 218 and 242, and content loss 234 may be calculated as a measure of distance between latent representations 216 and 242.

Objective function 212 may thus include a weighted sum and/or another combination of style loss 232 and content loss 234. For example, objective function 212 may be a loss function that includes the sum of style loss 232 multiplied by one coefficient and content loss 234 multiplied by another coefficient. The coefficients may sum to 1, and each coefficient may be selected to increase or decrease the presence of style-based attributes 238 and content-based attributes 240 in decoder output 210.

In some embodiments, style loss 232 and/or content loss 234 are calculated using features outputted by various layers of encoders 202 and 204 and/or decoder 206. For example, style loss 232 and/or content loss 234 may include measures of distance between features produced by earlier layers of encoders 202 and 204 and/or decoder 206, which capture smaller features (e.g., details, textures, edges, etc.) in the corresponding input. Style loss 232 and/or content loss 234 may also, or instead, include measures of distance between features produced by subsequent layers of encoders 202 and 204 and/or decoder 206, which capture more global features (e.g., overall shapes of objects, parts of objects, etc.) in the corresponding input.

When style loss 232 and/or content loss 234 include multiple measures of distance (e.g., between features produced by different encoder layers), objective function 212 may specify a different weighting for each measure. For example, style loss 232 may include a higher weight or coefficient for the distance between lower-level features produced by earlier layers of encoder 208 from decoder output 210 and features produced by corresponding layers of encoder 204 from the style sample to increase the presence of "local" style-based attributes 238 such as lines, edges, brush strokes, colors, and/or patterns. Conversely, content loss 234 may include a higher weight for the distance between higher-level "global" features produced by subsequent layers of encoder 208 from decoder output 210 and features produced by corresponding layers of encoder 202 from the content sample at higher resolutions to increase the presence of overall content-based attributes 238 such as recognizable features or shapes of objects.

After style loss 232, content loss 234, and objective function 212 are calculated for one or more pairs of training content samples 224 and training style samples 228 in training data 214, training engine 122 updates parameters of one or more components of style transfer model 200 based on objective function 212. For example, training engine 122 may use a training technique (e.g., gradient descent and backpropagation) and/or one or more hyperparameters to iteratively update weights of kernel predictor 220 and/or decoder 206 in a way that reduces the loss function (e.g., objective function 212) associated with style loss 232 and content loss 234. In some embodiments, hyperparameters define higher-level properties of style transfer model 200 and/or are used to control the training of style transfer model 200. For example, hyperparameters for style transfer model 200 may include, but are not limited to, batch size, learning rate, number of iterations, numbers and sizes of convolutional kernels 222 outputted by kernel predictor 220, numbers of layers in each of encoders 202 and 204 and decoder 206, and/or thresholds for pruning weights in neural network layers. In turn, decoder output 210 produced for subsequent pairs of training content samples 224 and training style samples 228 may include proportions of style-based attributes 238 and content-based attributes 240 that reflect the weights and/or coefficients associated with style loss 232 and content loss 234 in the loss function.

After training engine 122 has completed training of style transfer model 200, execution engine 124 may execute the trained style transfer model 200 to produce style transfer result 236 from a new content sample 226 and style sample 230. For example, execution engine 124 may input a content image (e.g., an image of a face) and a style image (e.g., an artistic depiction of an object or scene that does not have to be a face) into style transfer model 200 and obtain, as output from style transfer model 200, a style transfer image that includes one or more style-based attributes 238 of the style image (independent of the content in the style image) and one or more content-based attributes 240 of the content image (independent of the style of the content image). Thus, if the content image includes a face and the style image includes colors, edges, brush strokes, lines, and/or other patterns that represent a certain artistic style, the style transfer image may include shapes that represent the eyes, nose, mouth, ears, hair, face shape, accessories, and/or clothing associated with the face. These shapes may be drawn or rendered using the colors, edges, brush strokes, lines, and/or patterns found in the style image, thereby transferring the "style" of the style image onto the content of the content image.

In another example, execution engine 124 may select a 3D mesh as content sample 226 and a different 3D mesh or a 2D image as style sample 230. After content sample 226 and style sample 230 are inputted into style transfer model 200, execution engine 124 may obtain, as style transfer result 236, a 3D mesh with a similar shape to the 3D mesh in content sample 226 and textures that are obtained from the 3D mesh or 2D image in style sample 230. Style transfer result 236 may then be rendered into a 2D image that represents a view of the 3D mesh textured with the 2D image.

Execution engine 124 may additionally include functionality to generate style transfer result 236 for a series of related content samples and/or style samples. For example, the content samples may include a series of frames in a first 2D or 3D film or animation, and the style samples may include one or more frames from a second 2D or 3D film or animation. Execution engine 124 may use style transfer model 200 to combine each frame in the content samples with a given artistic style in the style samples into a new series of frames that includes that the content from first film or animation and the style of the second film or animation. This type of style transfer may be used to apply the style of a given film to a related film (e.g., a prequel, sequel, etc.) and/or jump between different styles in the same film (e.g., by combining scenes in the film with different style samples). Consequently, style transfer model 200 may allow 2D or 3D content to be adapted to different and/or new styles without requiring manual recreation or modification of the content to reflect the desired styles.

Figure 3:
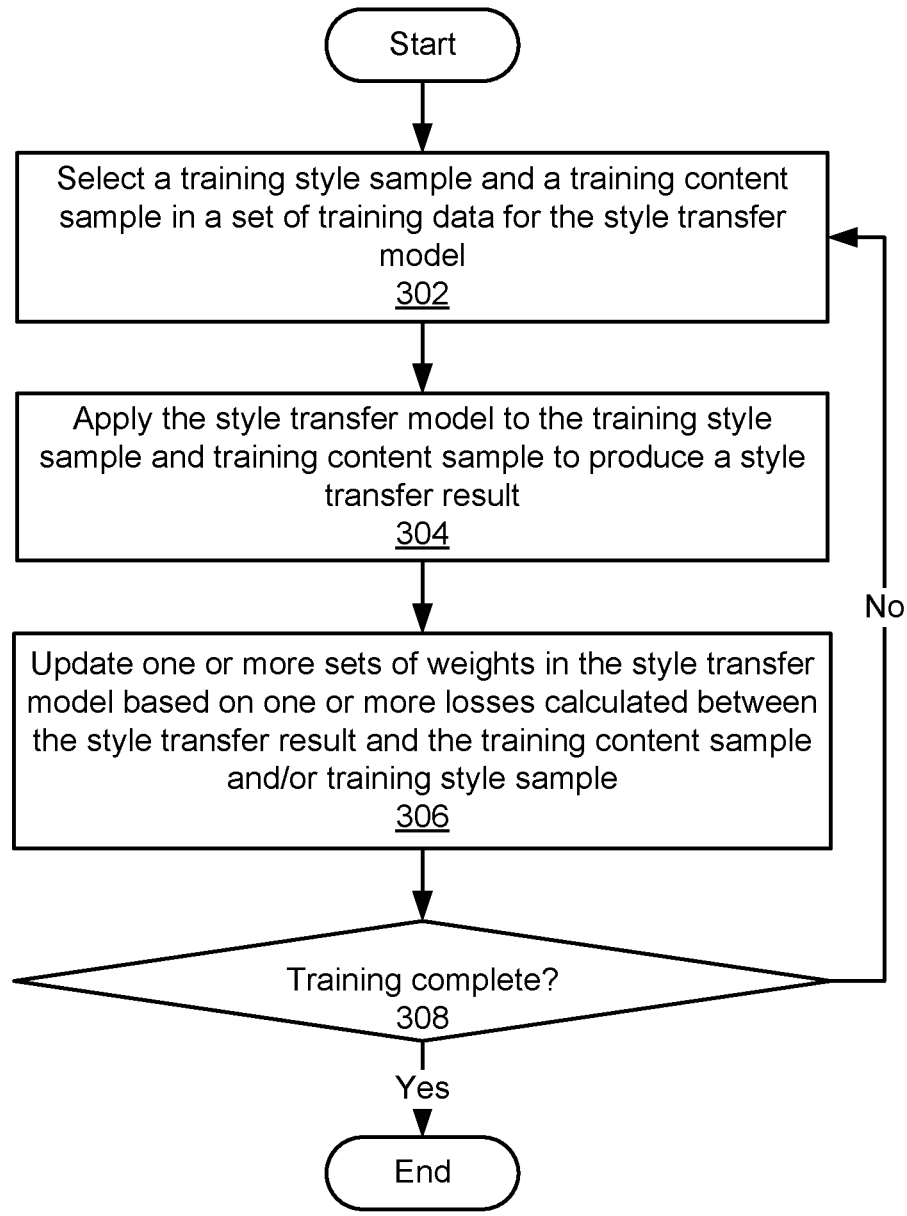
FIG. 3 is a flow chart of method steps for training a style transfer model, according to various embodiments.

FIG. 3 is a flow chart of method steps for training a style transfer model, according to various embodiments. Although the method steps are described in conjunction with the systems of FIGS. 1-2, persons skilled in the art will understand that any system configured to perform the method steps in any order falls within the scope of the present disclosure.

As shown, in operation 302, training engine 122 selects a training style sample and a training content sample in a set of training data for the style transfer model. For example, training engine 122 may randomly select the training style sample from a set of training style samples in the training data. Training engine 122 may also randomly select the training content sample from a set of training content samples in the training data.

Next, in operation 304, training engine 122 applies the style transfer model to the training style sample and training content sample to produce a style transfer result. For example, training engine 122 may use one or more encoder networks to convert the training style sample and training content sample into latent representations. Next, training engine 122 may use one or more layers of a kernel predictor to generate a series of convolutional kernels from the latent representation of the training style sample. Training engine 122 may then convolve the latent representation of the training content sample with the convolutional kernels to generate convolutional output and use a decoder network to convert the convolutional output into the style transfer result.

In operation 306, training engine 122 also updates one or more sets of weights in the style transfer model based on one or more losses calculated between the style transfer result and the training content sample and/or training style sample. For example, training engine 122 may calculate a style loss between the latent representations of the style transfer result and the training style sample and a content loss between the latent representations of the style transfer result and the training content sample. Training engine 122 may then calculate an overall loss as a weighted sum of the style loss and content loss and use gradient descent and backpropagation to update parameters of the kernel predictor and decoder network in a way that reduces the overall loss.

After operations 302, 304, and 306 are complete, training engine 122 may evaluate a condition 308 indicating whether or not training of the style transfer model is complete. For example, condition 308 may include, but is not limited to, convergence in parameters of the style transfer model, the lowering of the style and/or content loss to below a threshold, and/or the execution of a certain number of training steps, iterations, batches, and/or epochs. If condition 308 is not met, training engine 122 may continue selecting pairs of training style samples and training content samples from the training data (operation 302), inputting the training style samples and training content samples into the style transfer model to produce style transfer results (operation 304), and updating weights of one or more neural networks and/or neural network layers in the style transfer model (operation 306). If condition 308 is met, training engine 122 ends the process of training the style transfer model.

Figure 4:
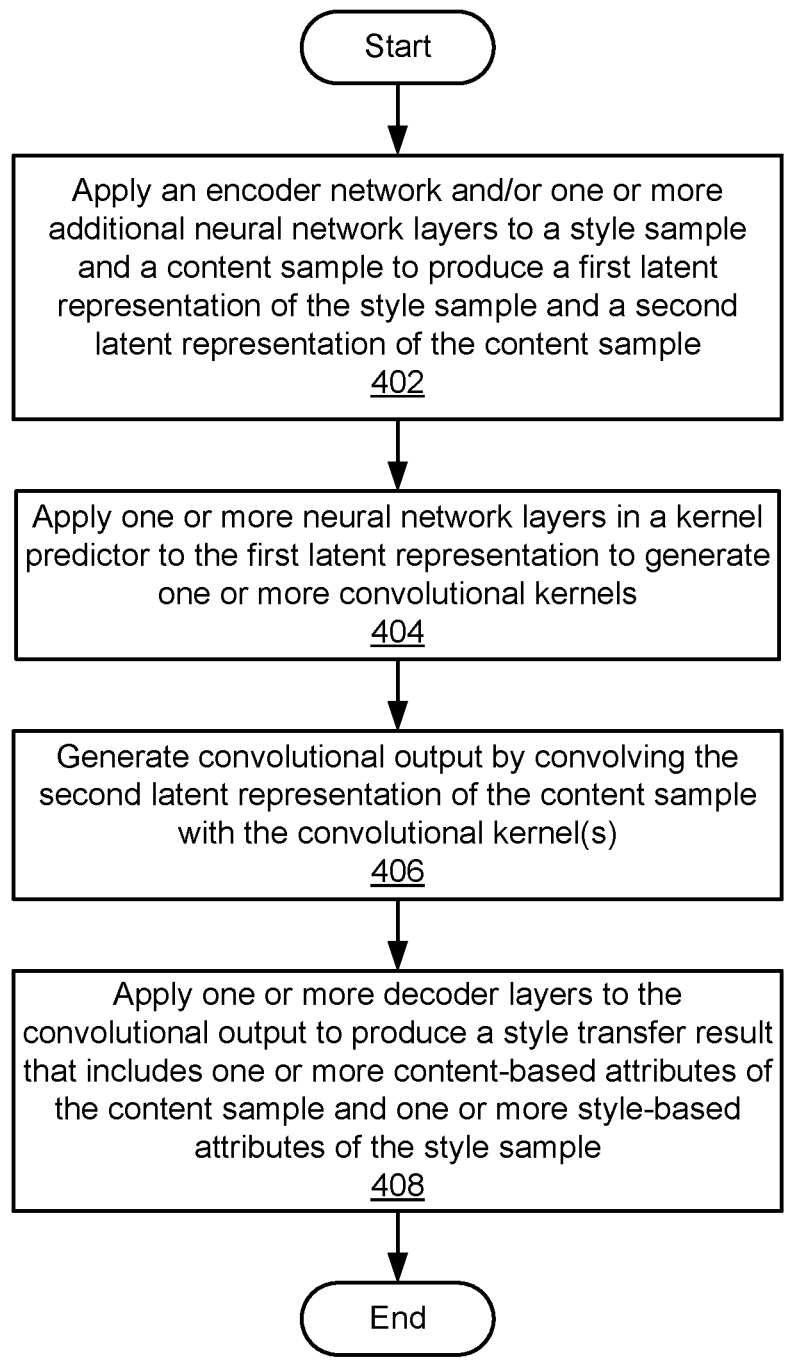
FIG. 4 is a flow chart of method steps for performing style transfer, according to various embodiments.

FIG. 4 is a flow chart of method steps for performing style transfer, according to various embodiments. Although the method steps are described in conjunction with the systems of FIGS. 1-2, persons skilled in the art will understand that any system configured to perform the method steps in any order falls within the scope of the present disclosure.

As shown, in operation 402, execution engine 124 applies an encoder network and/or one or more additional neural network layers to a style sample and a content sample to produce a first latent representation of the style sample and a second latent representation of the content sample. For example, the content and style samples may include images, meshes, and/or other 2D or 3D representations of objects, textures, or scenes. Execution engine 124 may use a pre-trained encoder such as VGG, ImageNet, ResNet, GoogLeNet, and/or Inception to convert the style sample and content sample into two separate feature maps. Execution engine 124 may use a multilayer perceptron to compress the feature map for the style sample into a latent style vector and use the latent style vector as the first latent representation of the style sample. Execution engine 124 may normalize the feature map for the content sample and use the normalized feature map as the second latent representation of the content sample.

Next, in operation 404, execution engine 124 applies one or more neural network layers in a kernel predictor to the first latent representation to generate one or more convolutional kernels. For example, execution engine 124 may use the kernel predictor to generate one or more series of convolutional kernels, with each series of convolutional kernels used to produce output at a corresponding resolution. Execution engine 124 may also generate, as additional output of the one or more neural network layers, one or more biases to be applied after some or all of the convolutional kernels.

In operation 406, execution engine 124 generates convolutional output by convolving the second latent representation of the content sample with the convolutional kernel(s). For example, execution engine 124 may convolve the second latent representation with a first kernel to produce a first output matrix at a first resolution. Execution engine 124 may apply one or more additional layers and/or operations to the first output matrix to produce a modified output matrix and then convolve the modified output matrix with one or more additional convolutional kernels to produce a second output matrix at a second resolution that is higher than the first resolution. As a result, execution engine 124 may apply features extracted from the style sample at different resolutions to the second latent representation of the content sample.

In operation 408, execution engine 124 applies one or more decoder layers to the convolutional output to produce a style transfer result that includes one or more content-based attributes of the content sample and one or more style-based attributes of the style sample. For example, execution engine 124 may use convolutional and/or upsampling layers in a decoding network to convert the convolutional output into an image, a mesh, and/or another 2D or 3D representation. The representation may include shapes and/or other identifying attributes of objects in the content sample and colors, patterns, brush strokes, lines, edges, and/or other depictions of the style in the style sample.

As mentioned above, some or all convolutions performed in operation 406 may be integrated into operation 408. For example, some or all of the decoder layers may be used to convolve the convolutional output generated by one or series of convolutional kernels with one or more additional series of convolutional kernels during conversion of the convolutional output into the style transfer result. Alternatively, all convolutional kernels may be used in the decoder layers to convert the second latent representation of the content sample into the style transfer result. Consequently, convolutional kernels may be used by any components, layers, or operations after the convolutional kernels have been produced from the first latent representation of the style sample.

Adaptive Convolutions in Neural Networks

While the adaptive convolution techniques have been described above with respect to style transfer, convolutional kernels 222 can be used by training engine 122, execution engine 124, and/or other components in various applications related to decoding operations in neural networks. The general use of adaptive convolutional kernels 222 in neural network decoding operations and additional applications of adaptive convolutional kernels 222 in neural network decoding operations are described below with respect to FIG. 5.

Figure 5:
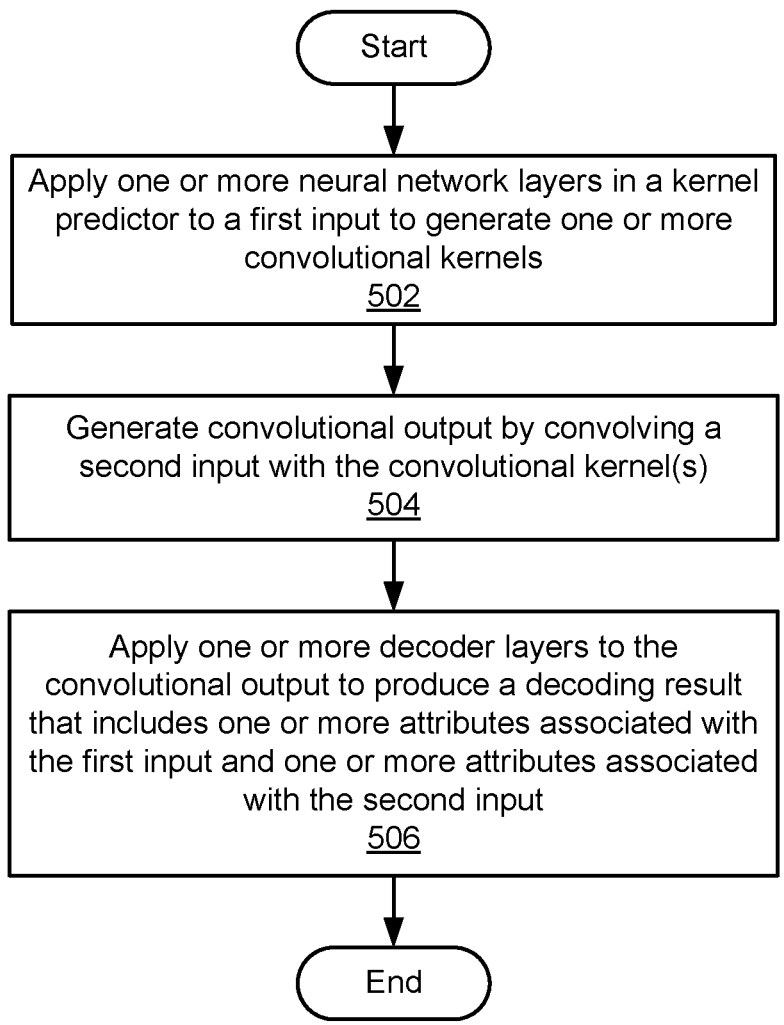
FIG. 5 is a flow chart of method steps for performing adaptive convolutions in a neural network, according to various embodiments.

FIG. 5 is a flow chart of method steps for performing adaptive convolutions in a neural network, according to various embodiments. Although the method steps are described in conjunction with the systems of FIGS. 1-2, persons skilled in the art will understand that any system configured to perform the method steps in any order falls within the scope of the present disclosure.

As shown, in operation 502, execution engine 124 and/or another component apply one or more neural network layers in a kernel predictor to a first input to generate one or more convolutional kernels. For example, the first input may be generated by an encoder network and/or another type of neural network as feature maps, embeddings, encodings, and/or other representations of a first set of data. The component may use the kernel predictor to generate one or more series of convolutional kernels from the first input, with each series of convolutional kernels used to produce output at a corresponding resolution. The component may also generate, as additional output of the one or more neural network layers, one or more biases to be applied after some or all of the convolutional kernels.

Next, in operation 504, the component generates convolutional output by convolving a second input with the convolutional kernel(s). For example, the component may use the convolutional kernel(s) to apply features extracted from the first input at different resolutions to the second input.

In operation 506, the component applies one or more decoder layers to the convolutional output to produce a decoding result that includes one or more attributes associated with the first input and one or more attributes associated with the second input. For example, the component may apply the decoder layers to convolutional output that is generated after all convolutional kernels have been convolved with the second input, or the component may use some or all convolutional kernels in the decoder layers to generate the decoding result from the second input.

In one or more embodiments, operations 502, 504, and 506 are performed in the context of a generative model such as a generative adversarial network (GAN) to control and/or adjust the generation of images, text, audio, and/or other types of output by the generative model. For example, the GAN may include a Style Generative Adversarial Network (StyleGAN) or StyleGAN2 model, and the first input may include a latent code w produced by a mapping network in the StyleGAN or StyleGAN2 model based on a sample z from a distribution of latent variables learned by the mapping network. Within the StyleGAN model, each learned affine transformation "A" and adaptive instance normalization (AdaIN) block that uses the latent code to perform AdaIN on the output of each convolution layer in a synthesis network g can be replaced with a corresponding kernel predictor and a number of convolutional kernels (e.g., a depthwise 3×3 convolution, a pointwise 1×1 convolution, and a per-channel bias) generated by the kernel predictor from the latent code. Similarly, within the StyleGAN2 model, each weight demodulation block in the synthesis network that converts the latent code into a demodulation operation that is applied to a corresponding 3×3 convolution can be replaced with a kernel predictor and corresponding convolutional kernels (e.g., a depthwise 3×3 convolution, a pointwise 1×1 convolution, and a per-channel bias) generated by the kernel predictor from the latent code.

Continuing with the above example, the StyleGAN or StyleGAN2 model can be trained using standard techniques, and operation 502 can be performed to generate convolutional kernels at each layer of the synthesis network from the latent code. In operations 504 and 506, the convolutional kernels may be applied within the synthesis network to a second input that includes a constant input c, the up-sampled input from the previous layer in the synthesis network, and/or a Gaussian noise input that includes per-channel scaling factors "B" applied to the up-sampled input. At each resolution level of the synthesis network, the output of the last layer can be converted into RGB using a 1×1 convolution to produce an image that is added to the up-sampled RGB result of the previous layer; this gives the decoding result at the current resolution.

Operations 502, 504, and 506 can also, or instead, performed in the context of generating or modifying a 2D or 3D scene. For example, operation 502 may be performed to generate one or more series of convolutional kernels from a first input that includes embedded and/or encoded representations of camera parameters (e.g., camera model, camera pose, focal length, etc.), lighting parameters (e.g., light sources, lighting interactions, illumination models, shading, etc.), and/or other types of parameters that affect the rendering or appearance of the scene. In operation 504 and/or 506, the convolutional kernels may be applied to a second input that includes points, pixels, textures, feature embeddings, and/or other representations of the scene. The convolutional kernels may be applied before decoding is performed in operation 506, or some or all the convolutional kernels may be applied during operation 506 by one or more decoder layers. The output of the decoder layers may include a representation (e.g., image, mesh, point cloud, etc.) of the 2D or 3D scene. This representation may include objects, shapes, and/or structures from the second input, which are depicted in a way that reflects the camera, lighting, and/or other types of parameters from the first input.

In sum, the disclosed techniques utilize deep learning and adaptive convolutions with decoding operations in a neural network, such as decoding operations that perform style transfer between a content sample and a style sample. The content sample and style sample may include (but are not limited to) one or more images, meshes, and/or other depictions or models of objects, scenes, or concepts. An encoder network may be used to convert the content sample and style sample into latent representations in a lower-dimensional space. A kernel predictor generates a number of convolutional kernels from the latent representation of the style sample, so that the convolutional kernels are "adapted" to capture features at varying resolutions or granularities in the style sample. The latent representation of the content sample is then convolved with the convolutional kernels to produce convolutional output at different resolutions, and some or all of the convolutional output is converted into a style transfer result that incorporates the content of the content sample and the style of the style sample.

Advantageously, by identifying features at varying resolutions in the style sample and transferring these features to the content sample (e.g., by convolving the features with a latent representation of the content sample), the disclosed techniques allow both low- and high-level style attributes in the style sample to be included in the style transfer result. The style transfer result may thus include a better depiction of the style in the style sample than a conventional style transfer result that incorporates only the global statistics of a style sample into the content of a content sample. The disclosed techniques provide additional improvements in overhead and/or resource consumption over existing techniques for producing content in a certain style. For example, a conventional technique for adapting an image, video, and/or other content to a new style may involve users manually capturing, creating, editing, and/or rendering the content in the new style. Drawing, modeling, editing, and/or other tools used by the users to create, update, and store the content may consume significant computational, memory, storage, network, and/or other resources. In contrast, the disclosed techniques may perform batch processing that uses the style transfer model to automatically transfer the style onto the content, which consumes less time and/or resources than the manual creation or modification of the content performed in the conventional technique. Consequently, by automating the transfer of styles to content and improving the comprehensiveness and accuracy of the style transfer, the disclosed embodiments provide technological improvements in computer systems, applications, frameworks, and/or techniques for generating content and/or performing style transfer.

1. In some embodiments, a method for performing style transfer between a content sample and a style sample comprises applying one or more neural network layers to a first latent representation of the style sample to generate one or more convolutional kernels, generating convolutional output by convolving a second latent representation of the content sample with the one or more convolutional kernels, and applying one or more decoder layers to the convolutional output to produce a style transfer result that comprises one or more content-based attributes of the content sample and one or more style-based attributes of the style sample.

2. The method of clause 1, further comprising updating a first set of weights in the one or more neural network layers and a second set of weights in the one or more decoder layers based on one or more losses calculated between the style transfer result and at least one of the content sample or the style sample.

3. The method of clauses 1 or 2, wherein the one or more losses comprise a style loss between a third latent representation of the style transfer result and the first latent representation of the style sample.

4. The method of any of clauses 1-3, wherein the one or more losses comprise a content loss between a third latent representation of the style transfer result and the second latent representation of the content sample.

5. The method of any of clauses 1-4, wherein the one or more losses comprise a weighted sum of a first loss between the style transfer result and the style sample and a second loss between the style transfer result and the content sample.

6. The method of any of clauses 1-5, further comprising applying an encoder network to the content sample to produce the second latent representation as a feature embedding of the content sample.

7. The method of any of clauses 1-6, further comprising generating, as additional output of the one or more neural network layers, one or more biases to be applied after the one or more convolutional kernels.

8. The method of any of clauses 1-7, further comprising applying an encoder network to the style sample to produce a feature embedding of the style sample, and inputting the feature embedding into one or more additional neural network layers to produce the first latent representation as a latent style vector.

9. The method of any of clauses 1-8, wherein generating the convolutional output comprises convolving the second latent representation with a first kernel to produce a first output matrix at a first resolution, applying one or more additional neural network layers to the first output matrix to produce a modified output matrix, and convolving the modified output matrix with one or more additional convolutional kernels to produce a second output matrix at a second resolution that is higher than the first resolution.

10. The method of any of clauses 1-9, wherein at least a portion of the convolutional output is generated using the one or more decoder layers.

11. The method of any of clauses 1-10, wherein the content sample and the style sample comprise at least one of an image or a mesh.

12. In some embodiments, a non-transitory computer readable medium stores instructions that, when executed by a processor, cause the processor to perform the steps of applying one or more neural network layers to a first latent representation of a style sample to generate one or more convolutional kernels, generating convolutional output by convolving a second latent representation of a content sample with the one or more convolutional kernels, and applying one or more decoder layers to the convolutional output to produce a style transfer result that comprises one or more content-based attributes of the content sample and one or more style-based attributes of the style sample.

13. The non-transitory computer readable medium of clause 12, wherein, when executed by the processor, the instructions further cause the processor to perform the steps of updating a first set of weights in the one or more neural network layers and a second set of weights in the one or more decoder layers based on one or more losses calculated between the style transfer result and at least one of the content sample or the style sample.

14. The non-transitory computer readable medium of clauses 12 or 13, wherein the one or more losses comprise a weighted sum of a style loss between a third latent representation of the style transfer result and the first latent representation of the style sample and a content loss between the third latent representation of the style transfer result and the second latent representation of the content sample.

15. The non-transitory computer readable medium of any of clauses 12-14, wherein, when executed by the processor, the instructions further cause the processor to perform the steps of applying an encoder network to the style sample to produce a first feature embedding of the style sample, and inputting the first feature embedding into one or more additional neural network layers to produce the first latent representation as a latent style vector.

16. The non-transitory computer readable medium of any of clauses 12-15, wherein, when executed by the processor, the instructions further cause the processor to perform the steps of applying the encoder network to the content sample to produce the second latent representation as a second feature embedding of the content sample, and normalizing the second latent representation prior to generating the convolutional output.

17. The non-transitory computer readable medium of any of clauses 12-16, wherein generating the convolutional output comprises convolving the second latent representation with a first kernel to produce a first output matrix at a first resolution, applying one or more additional neural network layers to the first output matrix to produce a modified output matrix, and convolving the modified output matrix with one or more additional convolutional kernels to produce a second output matrix at a second resolution that is higher than the first resolution.

18. The non-transitory computer readable medium of any of clauses 12-17, wherein the one or more content-based attributes comprise a recognizable arrangement of abstract shapes representing an object in the content image.

19. The non-transitory computer readable medium of any of clauses 12-18, wherein the one or more style-based attributes comprise at least one of a line, an edge, a brush stroke, a color, or a pattern in the style image.

20. In some embodiments, a system comprises a memory that stores instructions, and a processor that is coupled to the memory and, when executing the instructions, is configured to apply an encoder network to a style image and a content image to generate a first latent representation of the style image and a second latent representation of the content image, apply one or more neural network layers to the first latent representation to generate one or more convolutional kernels, generate convolutional output by convolving the second latent representation with the one or more convolutional kernels, and apply one or more decoder layers to the convolutional output to produce a style transfer result that comprises one or more content-based attributes of the content sample and one or more style-based attributes of the style sample.

21. In some embodiments, a method for performing convolutions within a neural network comprises applying one or more neural network layers to a first input to generate one or more convolutional kernels, generating convolutional output by convolving a second input with the one or more convolutional kernels, and applying one or more decoder layers to the convolutional output to produce a decoding result, wherein the decoding result comprises one or more first attributes of the first input and one or more second attributes of the second input.

22. The method of clause 21, wherein the first input comprises one or more samples from a latent distribution associated with a generator network and the second input comprises one or more noise samples from one or more noise distributions.

23. The method of clauses 21 or 22, wherein the one or more convolutional kernels comprise a depthwise convolution, a pointwise convolution, and a per-channel bias.

24. The method of any of clauses 21-23, wherein the second input comprises a representation of a scene and the first input comprises one or more parameters that control a depiction of the scene.

25. The method of any of clauses 21-24, wherein the one or more parameters comprise at least one of a lighting parameter and a camera parameter.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for performing style transfer between a content sample and a style sample, comprising:
   compressing a feature embedding generated from the style sample into a first latent representation comprising a d-dimensional vector;
   applying one or more neural network layers to the first latent representation of the style sample to generate a first set of convolutional kernels associated with a first level of granularity of the style sample and a second set of convolutional kernels associated with a second level of granularity of the style sample;
   generating convolutional output by convolving a second latent representation of the content sample with the first set of convolutional kernels; and
   applying one or more decoder layers to the convolutional output to produce a style transfer result that comprises one or more content-based attributes of the content sample and one or more style-based attributes associated with the first level of granularity of the style sample.

2. The method of claim 1, further comprising updating a first set of weights in the one or more neural network layers and a second set of weights in the one or more decoder layers based on one or more losses calculated between the style transfer result and at least one of the content sample or the style sample.

3. The method of claim 2, wherein the one or more losses comprise a style loss between a third latent representation of the style transfer result and the first latent representation of the style sample.

4. The method of claim 2, wherein the one or more losses comprise a content loss between a third latent representation of the style transfer result and the second latent representation of the content sample.

5. The method of claim 2, wherein the one or more losses comprise a weighted sum of a first loss between the style transfer result and the style sample and a second loss between the style transfer result and the content sample.

6. The method of claim 1, further comprising applying an encoder network to the content sample to produce the second latent representation as a feature embedding of the content sample.

7. The method of claim 1, further comprising generating, as additional output of the one or more neural network layers, one or more biases to be applied after the one or more convolutional kernels.

8. The method of claim 1, further comprising:
   applying an encoder network to the style sample to produce the feature embedding of the style sample; and
   inputting the feature embedding into one or more additional neural network layers to produce the d-dimensional vector.

9. The method of claim 1, wherein generating the convolutional output comprises:
   convolving the second latent representation with a first kernel in the first set to produce a first output matrix at a first resolution;
   applying one or more additional neural network layers to the first output matrix to produce a modified output matrix; and
   convolving the modified output matrix with a second kernel in the second set to produce a second output matrix at a second resolution that is higher than the first resolution.

10. The method of claim 1, wherein at least a portion of the convolutional output is generated using the one or more decoder layers.

11. The method of claim 1, wherein the content sample and the style sample comprise at least one of an image or a mesh.

12. The method of claim 1, wherein the one or more convolutional kernels comprise at least one of a depthwise convolution, a pointwise convolution, or a per-channel bias.

13. The method of claim 1, wherein the content sample comprises a representation of a scene and the style sample comprises one or more parameters that control a depiction of the scene.

14. The method of claim 13, wherein the one or more parameters comprise at least one of a lighting parameter or a camera parameter.

15. A non-transitory computer readable medium storing instructions that, when executed by a processor, cause the processor to perform the steps of:
   compressing a feature embedding generated from the style sample into a first latent representation comprising a d-dimensional vector;
   applying one or more neural network layers to the first latent representation of the style sample to generate a first set of convolutional kernels associated with a first level of granularity of the style sample and a second set of convolutional kernels associated with a second level of granularity of the style sample;
   generating convolutional output by convolving a second latent representation of the content sample with the first set of convolutional kernels; and
   applying one or more decoder layers to the convolutional output to produce a style transfer result that comprises one or more content-based attributes of the content sample and one or more style-based attributes associated with the first level of granularity of the style sample.

16. The non-transitory computer readable medium of claim 15, wherein, when executed by the processor, the instructions further cause the processor to perform the steps of updating a first set of weights in the one or more neural network layers and a second set of weights in the one or more decoder layers based on one or more losses calculated between the style transfer result and at least one of the content sample or the style sample.

17. The non-transitory computer readable medium of claim 16, wherein the one or more losses comprise a weighted sum of a style loss between a third latent representation of the style transfer result and the first latent representation of the style sample and a content loss between the third latent representation of the style transfer result and the second latent representation of the content sample.

18. The non-transitory computer readable medium of claim 15, wherein, when executed by the processor, the instructions further cause the processor to perform the steps of:
applying an encoder network to the style sample to produce a first feature embedding of the style sample; and
inputting the first feature embedding into one or more additional neural network layers to produce the d-dimensional vector.

19. The non-transitory computer readable medium of claim 18, wherein, when executed by the processor, the instructions further cause the processor to perform the steps of:
applying the encoder network to the content sample to produce the second latent representation as a second feature embedding of the content sample; and
normalizing the second latent representation prior to generating the convolutional output.

20. The non-transitory computer readable medium of claim 15, wherein generating the convolutional output comprises:
convolving the second latent representation with a first kernel in the first set to produce a first output matrix at a first resolution;
applying one or more additional neural network layers to the first output matrix to produce a modified output matrix; and
convolving the modified output matrix with a second kernel in the second set to produce a second output matrix at a second resolution that is higher than the first resolution.

21. The non-transitory computer readable medium of claim 15, wherein the one or more content-based attributes comprise a recognizable arrangement of abstract shapes representing an object in the content sample.

22. The non-transitory computer readable medium of claim 15, wherein the one or more style-based attributes comprise at least one of a line, an edge, a brush stroke, a color, or a pattern in the style sample.

23. A system, comprising:
a memory that stores instructions, and
a processor that is coupled to the memory and, when executing the instructions, is configured to:
compress a feature embedding generated from the style sample into a first latent representation comprising a d-dimensional vector;
apply one or more neural network layers to the first latent representation of the style sample to generate a first set of convolutional kernels associated with a first level of granularity of the style sample and a second set of convolutional kernels associated with a second level of granularity of the style sample;
generate convolutional output by convolving a second latent representation of the content sample with the first set of convolutional kernels; and
apply one or more decoder layers to the convolutional output to produce a style transfer result that comprises one or more content-based attributes of the content sample and one or more style-based attributes associated with the first level of granularity of the style sample.

* * * * *